United States Patent [19]

Straub

[11] 4,268,072
[45] May 19, 1981

[54] PIPE COUPLING FOR INTERCONNECTING PIPES EXPERIENCING LENGTH CHANGES

[76] Inventor: Immanuel Straub, 7323 Wangs, Switzerland

[21] Appl. No.: 26,054

[22] Filed: Apr. 2, 1979

[30] Foreign Application Priority Data

Apr. 10, 1978 [AT] Austria ................................. 2517/78

[51] Int. Cl.³ ............................................. F16L 17/04
[52] U.S. Cl. .................................... 285/112; 285/373
[58] Field of Search ............... 285/104, 105, 108, 112, 285/340, 373

[56] References Cited

U.S. PATENT DOCUMENTS

| | | | |
|---|---|---|---|
| 2,036,320 | 4/1936 | Connelly et al. | 285/112 X |
| 2,491,004 | 12/1949 | Graham | 285/112 X |
| 2,702,202 | 2/1955 | Kaiser | 285/108 X |
| 3,116,078 | 12/1963 | Scherer | 285/112 X |
| 3,877,733 | 4/1975 | Straub | 285/373 X |
| 4,108,479 | 8/1978 | Straub | 285/373 X |
| 4,119,333 | 10/1978 | Straub | 285/373 X |

*Primary Examiner*—Dave W. Arola
*Attorney, Agent, or Firm*—Werner W. Kleeman

[57] ABSTRACT

A pipe coupling for interconnecting pipes experiencing length changes, comprising a sealing gasket enclosed within a housing and having a substantially C-shaped cross-sectional configuration and open towards the inside. The end faces of end sections of the sealing gasket which merge at the web of the sealing gasket are each clamped, by means of a compression spring arranged within the sealing gasket, against a related substantially ring-shaped support disk which, in turn, is axially movable in conjunction with the one or other pipe with which such corresponding support disk is operatively associated.

6 Claims, 3 Drawing Figures

PIPE COUPLING FOR INTERCONNECTING PIPES EXPERIENCING LENGTH CHANGES

BACKGROUND OF THE INVENTION

The present invention relates to a new and improved construction of pipe coupling for interconnecting pipes or the like which experience changes in length, which pipe coupling is of the type comprising a sealing gasket having a substantially C-shaped cross-section and which opens towards the inside and is enclosed within a housing.

The tightness or sealing capability of such type coupling only then is guaranteed if there is insured that the ends of the C-shaped sealing gasket, throughout all operating conditions, snugly bear, and without being lengthwise shiftable, against the outside of one of the pipes to be interconnected. In particular, when interconnecting pipes which, during operation, experience appreciable changes in length, for instance owing to thermal expansion, the fulfillment of such condition, with heretofore known pipe couplings of this type, for instance as disclosed in U.S. Pat. No. 3,877,733, only could be accomplished with extreme difficulty. With these state-of-the-art pipe couplings the sealing gasket is practically entrapped within the housing and in such housing there are supported clamping rings which, in turn, are positively or form-lockingly anchored, by means of their inner diameter, at a respective one of the pipe ends which are to be interconnected. With this prior art pipe coupling both of the pipe ends are practically positively or form-lockingly, mechanically interconnected by means of the clamping rings and the housing, whereas the sealing gasket arranged within the housing sealingly bridges the pipe joint. Now if with these known pipe couplings pipes are interconnected which are formed, for instance, from materials having a high coefficient of thermal expansion, and if furthermore the one or both pipes are exposed to external influences and to alternating thermal loads caused by the medium carried within the pipe system—and therefore such pipes experience changes in length—, then the heretofore known pipe coupling either does not allow any relative displacement of the pipe ends in relation to one another, leading to deformation of the pipes, or, however, the positive connection between the clamping rings and the pipe is overcome. This in turn leads to the undesirable result that the sealing lips of the sealing gasket slide upon the pipe or pipes, as the case may be, and with time are surely worn. When this happens the tightness or sealing capability of the prior art pipe coupling is impaired.

These problems particularly arise in the case of solar energy installations or collectors where, as a general rule, the pipes carrying the heat storage medium extend at the focal line of the reflectors. These pipes are thus exposed to appreciable temperature fluctuations. Particularly with such type installations it is important to insure that the pipe connection, once the same has been made, retains its service life over a long period of time, especially if, as a rule, such pipe connection is located at difficulty accessible places.

SUMMARY OF THE INVENTION

Hence, with the foregoing in mind it is a primary object of the present invention to provide a new and improved construction of pipe coupling of the character described which is not associated with the aforementioned drawbacks and limitations of the prior art constructions.

Another and more specific object of the present invention aims at providing a pipe coupling of the previously described type, which insures that the sealing lips of the sealing gasket sealing bear against the pipes without any axial shifting, even if the pipes experience changes in length.

Yet a further significant object of the present invention aims at the provision of a new and improved construction of pipe coupling for interconnecting pipes exposed to changes in their length, which pipe coupling is relatively simple in construction and design, economical to manufacture, extremely reliable in operation, not readily subject to breakdown or malfunction, and affords good sealing action even upon length changes of the interconnected pipes.

Now in order to implement these and still further objects of the invention, which will become more readily apparent as the description proceeds, the proposed pipe coupling of the present development is manifested by the features that the end faces of sections of the sealing gasket which merge with the web of the sealing gasket are each clamped, by means of a pressure or compression spring arranged within the sealing gasket, against a related substantially ring-shaped support disk. These support disks, in turn, are connected so as to be axially movable in conjunction with one or the other of the related pipes or the like.

If, with a pipe connection produced by means of such pipe coupling, the pipes experience a change in length, then the end faces of the end sections of the sealing gasket and which merge with the web of the sealing gasket are indeed squeezed, but the sealing lips move in conjunction with the pipes due to the coaction of the compression spring with the support disks moving in conjunction with the pipes.

Advantageously, the pipe coupling comprises a housing which can be clamped about the ends of the pipes which are to be interconnected. The ring-shaped support disks are connected with the related pipe by means of resilient or spring-like claws. These resilient claws are formed by inwardly flexed flaps or tabs at the end faces of a substantially cylindrical bent segment formed of steel plate or other equivalent material, bearing by means of its outer diameter at the inner surface of the housing. In this way it is possible to insure that, upon tightening the housing, there is simultaneously formed the connection point between the pipe and related support disk.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
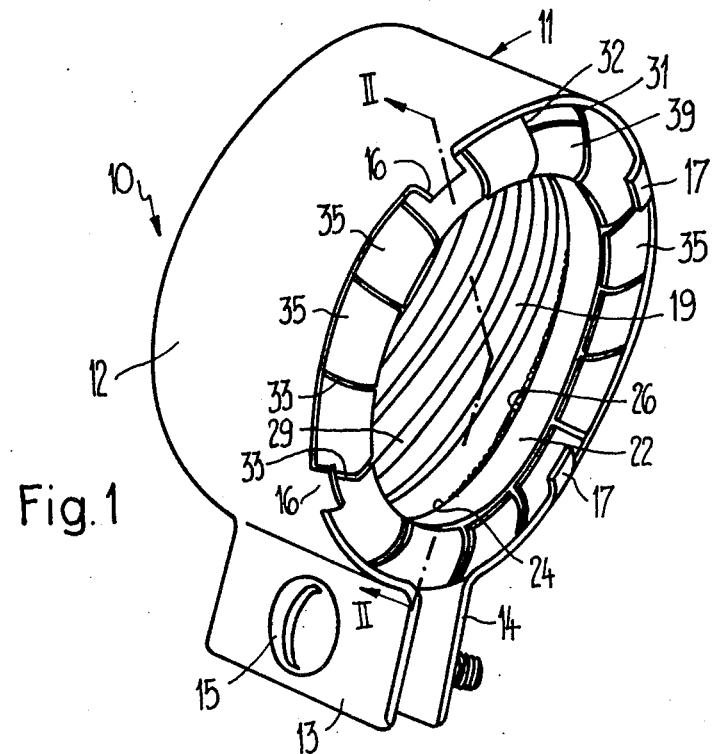
FIG. 1 is a perspective view of a pipe coupling according to the invention.

Describing now the drawings, the exemplary illustrated embodiment of pipe coupling 10, shown in FIG. 1, will be seen to comprise a housing 11 in the form of a pipe clamp or collar. More particularly, the housing 11 comprises an essentially cylindrical housing body 12 at which merge the tightening straps or brackets 13 and 14. It is possible to tighten the housing body 12 by inserting a screw 15 or equivalent element through the tightening strap 13 and to screw such into the other tightening strap 14, i.e., to fixedly clamp the housing body 12 about the pipe ends of the pipes, indicated by reference characters 41 and 42 in FIG. 2, which are to be interconnected. At both end edges of the housing body 12 of the housing 11, formed for instance of stainless steel plate, there are formed two or more inwardly bent tabs or flaps 16, 17 which essentially serve to prevent the parts mounted within the housing 11 from dropping out.

Figure 2:
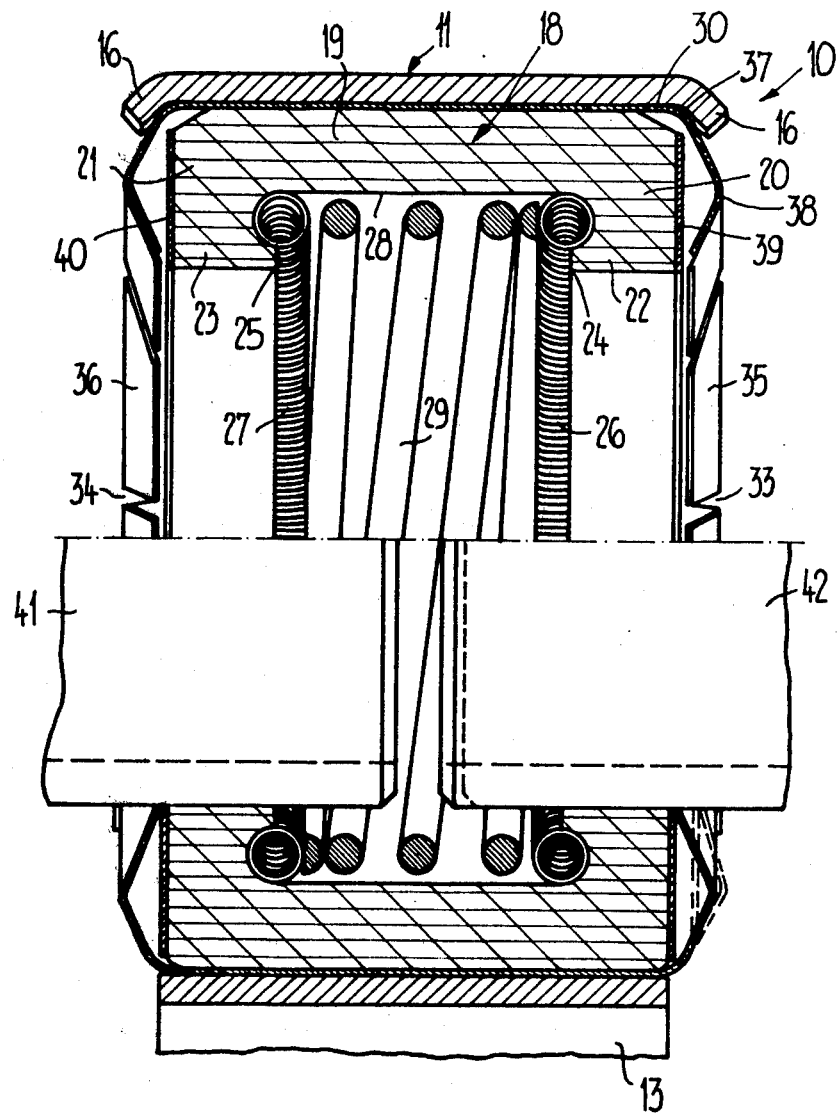
FIG. 2 is a sectional view, taken substantially along the line II—II of the pipe coupling depicted in FIG. 1, wherein in the upper half of the illustration there is shown the housing of the pipe coupling in an untightened condition and without any pipes inserted therein, whereas the lower half of the illustration shows the interconnected pipe ends and the housing in its clamped or tightened position.

As particularly well seen by referring to the upper half of the showing of FIG. 2, the housing 11 encloses, by means of its housing body 12, a sealing gasket 18 having an essentially C-shaped cross-section which is open towards the inside. The sealing gasket 18 is beneficially formed of a high-grade rubber or elastomeric material which is resistant to temperature fluctuations. In particular, the sealing gasket 18 contains a web 19 and end sections or portions 20 and 21 which merge with the ends of the web 19. Following each end section 20 and 21 is a sealing lip 22 and 23 having a sealing edge 24 and 25, respectively. The sealing lips 22 and 23 are supported in radial direction at the inner wall 28 of the web 19 by means of a respective, standard coil or helical spring ring 26 and 27, respectively. A compression of pressure spring 29, effective in axial direction, is supported at such coil spring rings 26 and 27. Compression spring 29 thus strives to force apart the end sections 20 and 21.

Between the sealing gasket 18 and the inside of the housing body 12 there is arranged an essentially cylindrical sector-shaped, flexed insert 30 formed of spring steel or other equivalent or suitable material. As best seen by referring to FIG. 1, this insert or insert member 30 is inserted into the housing 11 in a manner such that its confronting ends 31 and 32, i.e., the gap remaining free therebetween, is situated approximately diametrically opposite the gap between the tightening straps 13 and 14. At the axial ends of the insert member 30 there are formed the tabs or flaps 35 and 36 which are separated from one another by the slots 33 and 34, respectively. These tabs or flaps 35 and 36 are inwardly bent about two bending radii 37 and 38, and thus, form a type of spring or resilient claw.

Between the flaps 35 and 36 and the confronting end surfaces of the end sections 20 and 21, respectively, there is arranged a respective ring-shaped support disk or plate 39 and 40. The outer diameter of each of the support disks 39 and 40 is less than the diameter of the inner surface of the housing body 12 and their inner diameter is only slightly larger than the outer diameter of the pipes 41 and 42 which are to be interconnected. The support disks 39 and 40 could be, for instance, also fixedly bonded at the confronting end surfaces of the end sections 20 and 21 of the sealing gasket 18, but however they also can be loosely inserted between such end surfaces and the flaps 35 and 36, respectively.

The mode of operation of the described pipe coupling 10 is as follows. Initially, with the housing 11 not tightened the pipe coupling 10 is shoved over the pipe joint between the pipes 41 and 42 which are to be interconnected.

Upon tightening or clamping the housing 11 the radially inwardly directed edges of the flaps 35 and 36 fixedly claw into the outer surface of the related pipe 42 and 41, respectively. At the same time the sealing gasket 18 is radially inwardly upset. As a result, the sealing edges 24 and 25 of the sealing lips 22 and 23, respectively, supported by means of the coil spring rings 26 and 27 at the gasket web 19, are sealingly pressed against the outside of the pipes 42 and 41, respectively. The radially upsetting of the sealing gasket 18 also however causes it to be forced axially apart. This axial outward forcing of the sealing gasket 18 causes it to, in turn, displace the support disks 39 and 40 by means of the end sections 20 and 21, until these support disks 39 and 40 come to bear, at the region of their inner diameter, against the claw-like inner edges of the flaps 35 and 36 which have clawed into the related pipes 42 and 41, respectively. Now if one of the pipes shortens in length, as the same has been shown in FIG. 2 in broken lines at the lower right-hand portion thereof for the pipe 42, then the inner edges of the flaps 35, which have clawed into such pipe 42, move along with such pipe 42 which is experiencing a reduction in length, and equally the sealing lips, in this case the sealing lips 22 bearing against the pipe 42, move under the action of the compression spring 29, without shifting upon the pipe 42. On the other hand, if the pipes 41 and 42 increase in length then there occur in analogous fashion the same operations. The end faces of the end sections 20 and 21 always remain clamped between their related support rings 39 and 40 and the coil spring rings 26 and 27, respectively, and thus, also the sealing lips 22 and 23 are prevented from shifting at the pipes 42 and 41, respectively. These pipes 41 and 42, depending upon the capability of the flaps or tabs 35 and 36 to resiliently bend in axial direction, can also elongate or contract, without any danger of lift-off of the sealing lips 22 and 23.

Even if the material of the sealing gasket 18, during the course of time looses its elasticity owing to the alternating thermal load, nonetheless the sealing lips 22 and 23 remain snugly in contact with the pipes 42 and 41, respectively, under the action, on the one hand, of the coil spring rings 26 and 27 and the compression spring 29 and, on the other hand, the support rings 39 and 40, all of which remain unaffected by such alternating thermal load.

Figure 3:
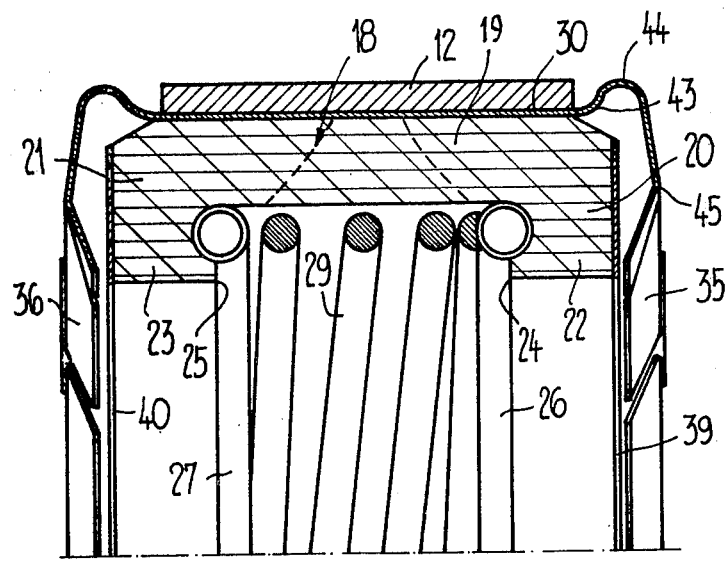
FIG. 3 is a fragmentary sectional view through a variant embodiment of the invention.

Finally, it is to be mentioned that with the embodiment shown in FIG. 3 there have been conveniently used the same reference characters, as in the arrangement of FIGS. 1 and 2, for the functionally corresponding parts. A dominant difference with this variant construction resides in the fact that the flaps 35 and 36 of the insert member 30 are flexed or bent at three locations, and specifically, firstly at location 43 towards the outside, then at location 44 towards the inside, and finally at location 45 towards the related support disks or plates 39 and 40. This construction of the flaps 35 and 36 provides for a longer spring path of their inner edges in axial direction. Additionally, with this construction of the insert member 30 there can be dispensed with the inwardly flexed or bent flaps or tabs 16 and 17 at the housing body 12, since, by virtue of the initially outwardly bent flaps 35 and 36, the parts of the pipe coupling are retained within the housing 11 so that they cannot become lost.

While there are shown and described present preferred embodiments of the invention, it should be distinctly understood that the invention is not limited thereto, but may be otherwise variously embodied and practiced within the scope of the following claims. Accordingly,

What I claim is:

1. A pipe coupling for interconnecting confronting ends of pipes experiencing changes in length comprising:
   a housing flexibly clampable about the pipe ends to be interconnected;
   a sealing gasket enclosed within said housing;
   said sealing gasket having a substantially C-shaped axial cross-sectional configuration and being open towards the interior of said housing;
   said sealing gasket including two confronting sealing lips each intended to sealingly engage the outside surface of a respective one of the pipe ends to be interconnected when the housing is being clamped;
   said sealing gasket further including web means positioned adjacent the inner surface of said housing and end sections merging with said sealing lips;
   each of said end sections having an end face;
   each of said end faces bearing against one side of a respective ring-shaped disk arranged to allow limited axial movement of said sealing gasket relative to said housing;
   means flexibly connected to the housing for fixedly engaging the outer surface of the pipe ends when the housing is being clamped and providing an axial stop for the other side of the respective ring-shaped disk, said means being arranged for limited axial movement relative to said housing upon movement of said pipe ends relative to said housing; and
   a compression spring being arranged within said sealing gasket for urging the end face of each end section against the respective ring-shaped disk and for urging the latter against the respective axial stop;
   wherein no wear occurs on the sealing lips of the gasket because said gasket lips move with said pipe ends upon movement of said ends relative to said housing.

2. The pipe coupling as defined in claim 1, wherein:
   said housing incorporates means enabling said housing to be clamped about the confronting ends of the pipes which are to be interconnected with one another;
   said flexible means comprising resilient claw means;
   a substantially cylindrical and flexed insert member having opposed ends;
   each of said opposed ends of said insert member having inwardly bent flaps defining said resilient claw means;
   said housing having an inner surface;
   said insert member having an outer surface bearing against said inner surface of said housing.

3. The pipe coupling as defined in claim 2, wherein: said insert member is formed of sheet metal.

4. The pipe coupling as defined in claim 2, wherein:
   a respective coil spring ring is provided for each sealing lip for supporting the related sealing lip at the web means of the sealing gasket;
   said compression spring having opposite ends; and
   each opposite end of the compression spring being axially supported upon its related coil spring ring.

5. The pipe coupling is defined in claim 2, wherein:
   said inert member encloses said sealing gasket; and
   said inwardly bent flaps of said insert member engage said pipe ends and said ring-shaped support disks.

6. The pipe coupling as defined in claim 1, wherein:
   a respective coil spring ring is provided for each sealing lip for supporting the related sealing lip at the web means of the sealing gasket;
   said compression spring having opposite ends; and
   each opposite end of the compression spring being axially supported upon its related coil spring ring.

* * * * *